D. J. TRIVERS & J. M. SCHNEIDER.
DRILL PRESS ATTACHMENT FOR OFFSET DRILLING.
APPLICATION FILED MAY 18, 1914.
1,112,730.
Patented Oct. 6, 1914.
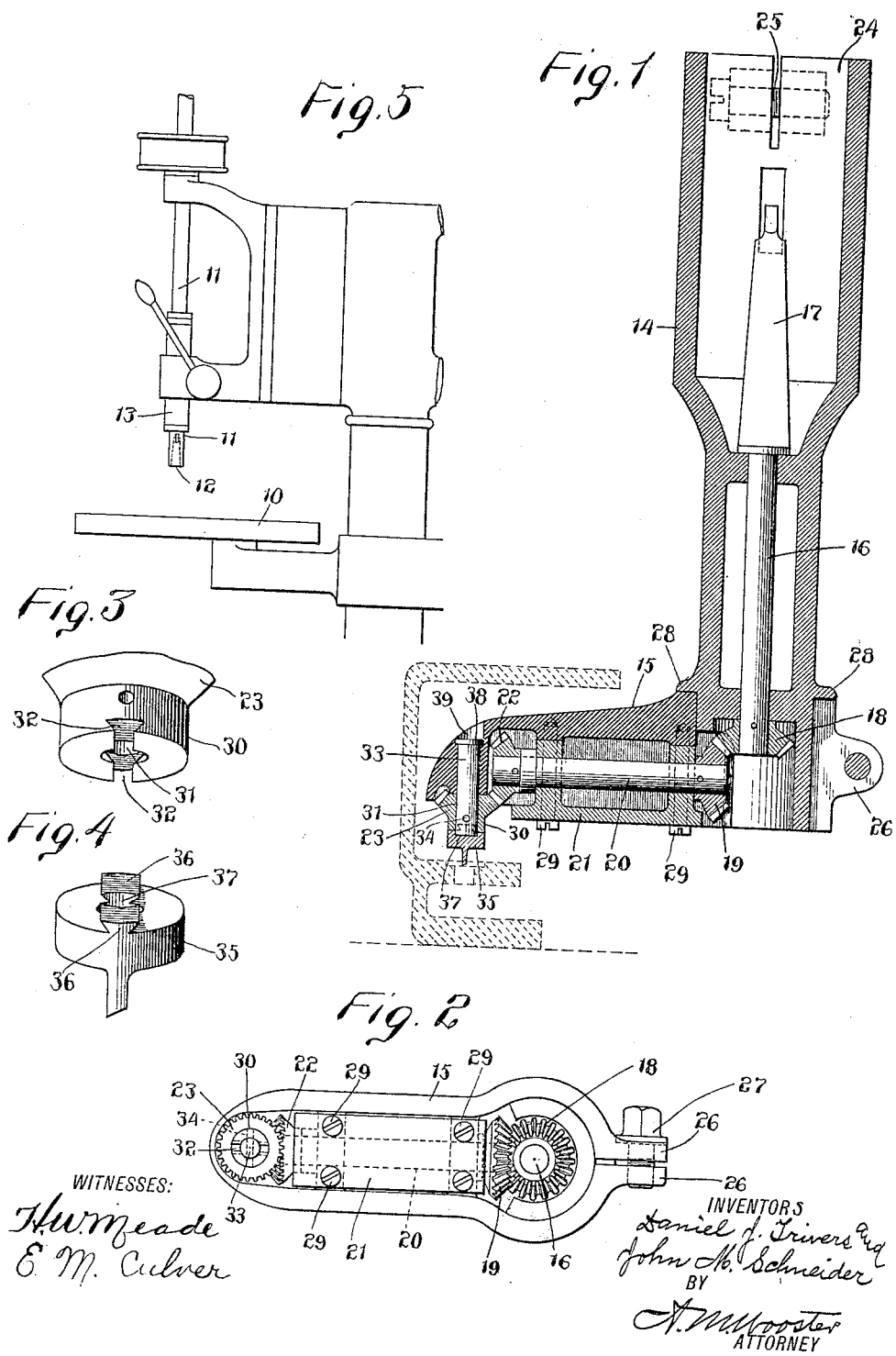

UNITED STATES PATENT OFFICE.

DANIEL J. TRIVERS, OF BRIDGEPORT, AND JOHN M. SCHNEIDER, OF LONG HILL, CONNECTICUT.

DRILL-PRESS ATTACHMENT FOR OFFSET DRILLING.

1,112,730.  Specification of Letters Patent.  Patented Oct. 6, 1914.

Application filed May 18, 1914. Serial No. 839,259.

*To all whom it may concern:*

Be it known that we, (1) DANIEL J. TRIVERS, a subject of the King of Great Britain, and (2) JOHN M. SCHNEIDER, a citizen of the United States, residing at (1) Bridgeport and (2) Long Hill, county of Fairfield, State of Connecticut, have invented an Improvement in Drill-Press Attachments for Offset Drilling, of which the following is a specification.

This invention has for its object to provide an attachment for drill presses that shall be relatively inexpensive to produce, easy to attach, to detach and to adjust and which will enable the operator to use various tools, as a counter bore, drill, reamer, mill, or a chuck for carrying a tool, in an off-set position, that is, out of alinement with the spindle of the press. In other words, our novel attachment enables the operator to perform various operations with a drill press in positions that cannot be reached by tools attached directly to the spindle of the press.

With this object in view we have devised the novel attachment of which the following description in connection with the accompanying drawing is a specification, reference characters being used to indicate the several parts:

Figure 1 is a view partly in elevation and partly in section illustrating the construction and mode of operation of our novel attachment; Fig. 2 an inverted plan view corresponding with Fig. 1, the tool being removed; Fig. 3 a perspective on an enlarged scale of the lower portion of the tool carrying bevel gear; Fig. 4 a perspective of a tool adapted to engage the gear, and Fig. 5 is an elevation of a portion of a drill press showing the sleeve to which the attachment is connected, and the chuck by which the driving mechanism of the attachment is actuated.

10 denotes the table of a drill press, 11 the spindle, 12 a chuck carried thereby, and 13 a stationary sleeve in which the spindle rotates.

Our novel attachment comprises essentially a body 14, an arm 15 adjustable thereon in the horizontal plane, a shaft 16 mounted to rotate in the body and having at its upper end a head 17 adapted to engage chuck 12 and at its lower end a bevel gear 18 which meshes with a bevel gear 19 on a shaft 20 mounted to rotate in a bearing block 21 secured to the arm and carrying at its other end a bevel gear 22 which engages a bevel gear 23 by which the tool is carried.

The body is provided with a socket 24 which receives both the chuck and the lower end of the sleeve. The chuck receives the head of shaft 16 and transmits motion thereto and the body is rigidly secured to the sleeve in any suitable manner. In the present instance we have shown the upper end of the body as split and as clamped upon the sleeve by means of a screw 25 passing through lugs on the body, indicated by dotted lines only. The arm is adjustably secured to the body in a similar manner, the rear end of the arm being split and provided with lugs 26 through which a screw 27 passes to draw the lugs together and clamp the arm upon the body at any desired adjustment in the horizontal plane. The body is shown as provided with a flange 28 against which the arm is set in attaching it. The bearing block 21 in which shaft 20 is mounted to rotate lies in a recess in the under side of the arm and is secured to the arm by screws 29.

The means for attaching tools is an important feature of the invention. Bevel gear 23 is provided with a central hole 31 and on its under side with a neck 30, and the neck is provided at its lower end with a transverse dovetail groove 32. The hole receives a short shaft 33 which extends slightly below the lower end of the neck. The bevel gear is shown as secured to the shaft by a pin 34.

35 denotes a tool, in the present instance a counter-sink. The body of the tool is provided with a dovetail 36 which is adapted to engage groove 32 in the neck, and with a socket 37 at the mid-length of the dovetail, which receives the lower end of the short shaft. The upper end of the short shaft is provided with a head 38 which rests upon the arm, the upper side of which is shown as provided with a recess 39 to receive the head.

It will be noted that the attachment can be attached or detached by simply tightening or loosening screw 25, and that the arm can be swung to any required adjustment in the horizontal plane when screw 27 is loose, and locked in place by tightening up the screw again. For work at different distances from the spindle of the press, different lengths of arms and shafts 20 are of course required.

To change tools or to shift from a tool to a chuck, it is simply necessary to remove pin 34, raise the short shaft and then slide the dovetail on the tool out of engagement with the groove in the neck of bevel gear 23.

Having thus described our invention we claim:

1. An attachment of the character described comprising a body having a socket adapted to receive a stationary sleeve, a vertical shaft in said body having a head adapted to engage a rotating chuck, an arm adjustably secured to the body in the horizontal plane, horizontal and vertical shafts in said arm, bevel gears intermediate said shafts, whereby the motion of the chuck is transmitted to the vertical shaft in the arm, and means for securing a tool to said vertical shaft.

2. An attachment of the character described comprising a body, a vertical shaft therein, an arm adjustably secured to the body, a horizontal shaft in the arm geared to the shaft in the body, a vertical shaft in the arm geared to the horizontal shaft, the gear on said vertical shaft having a neck provided at its lower end with a dovetail groove, and a tool having a dovetail adapted to engage said groove.

3. An attachment of the character described comprising a body, an arm adjustably secured thereto, a vertical shaft in said arm having a head engaging the top of the arm, a bevel gear detachably engaging said shaft and having a neck provided at its lower end with a transverse dovetail groove, said shaft passing through the gear and below the neck, and a tool having a socket to receive the end of the shaft and a dovetail to engage the groove, said tool being locked to the neck after the engagement of the dovetail with the groove by the engagement of the end of the shaft with the socket.

4. An attachment of the character described comprising a body, an arm adjustable thereon, a detachable bearing block in said arm, a horizontal shaft mounted to rotate in said block, a vertical shaft having a head resting on the arm, bevel gear wheels on said shafts, the gear wheel on the vertical shaft having a neck with a transverse dovetail groove and the shaft passing through the gear wheel and below the neck, and a tool having a dovetail to engage said groove and a socket to receive the end of the shaft.

In testimony whereof we affix our signatures in presence of two witnesses.

DANIEL J. TRIVERS.
JOHN M. SCHNEIDER.

Witnesses:
H. W. MEADE,
E. M. CULVER.

Copies of this patent may be obtained for five cents each, by addressing the "Commissioner of Patents, Washington, D. C."